(12) United States Patent
Liu

(10) Patent No.: US 8,440,331 B2
(45) Date of Patent: May 14, 2013

(54) MAGNETIC NANOHOLE SUPERLATTICES

(75) Inventor: Feng Liu, Salt Lake City, UT (US)

(73) Assignee: University of Utah, Salt Lake City, UT (US)

( * ) Notice: Subject to any disclaimer, the term of this patent is extended or adjusted under 35 U.S.C. 154(b) by 160 days.

(21) Appl. No.: 12/921,981

(22) PCT Filed: Mar. 12, 2009

(86) PCT No.: PCT/US2009/037009
§ 371 (c)(1), (2), (4) Date: Apr. 25, 2011

(87) PCT Pub. No.: WO2009/148679
PCT Pub. Date: Dec. 10, 2009

(65) Prior Publication Data
US 2011/0186947 A1 Aug. 4, 2011

Related U.S. Application Data

(60) Provisional application No. 61/069,213, filed on Mar. 12, 2008.

(51) Int. Cl.
*G11B 5/66* (2006.01)
(52) U.S. Cl.
USPC ........... 428/828; 428/323; 427/127; 427/130; 427/132

(58) Field of Classification Search ............ 428/828, 428/323; 427/127, 130, 132
See application file for complete search history.

(56) References Cited

U.S. PATENT DOCUMENTS

| | | |
|---|---|---|
| 2004/0137150 A1 | 7/2004 | Saito et al. |
| 2005/0196606 A1 | 9/2005 | Ihara et al. |
| 2005/0249980 A1 | 11/2005 | Itoh et al. |
| 2006/0286345 A1 | 12/2006 | Nakao et al. |
| 2011/0274928 A1* | 11/2011 | Liu .............................. 428/402 |

OTHER PUBLICATIONS

Yu et al. (A Unified Geometric Rule for Designing Nanomagnetism in Graphene, Nano Res. (2008) 1: 297-501).*
Lupton et al. (Collective Magnetic Behavior of Graphene Nanohole Superlattices, Nano. Res. (2008) 1:56-62).*
International Search Report for PCT Application No. PCT/US2009/037009 dated Jan. 11, 2010.

* cited by examiner

*Primary Examiner* — Telly Green
(74) *Attorney, Agent, or Firm* — Foley & Lardner LLP; Matthew L. Fenselau

(57) ABSTRACT

A magnetic material is disclosed including a two-dimensional array of carbon atoms and a two-dimensional array of nanoholes patterned in the two-dimensional array of carbon atoms. The magnetic material has long-range magnetic ordering at a temperature below a critical temperature Tc.

64 Claims, 14 Drawing Sheets

MAGNETIC NANOHOLE SUPERLATTICES

CROSS REFERENCE TO RELATED APPLICATIONS

This application is the U.S. National Stage of PCT Application Number PCT/US2009/037009, filed Mar. 12, 2009, which claims priority from U.S. Provisional Application Serial No. 61/069,213 filed on Mar. 13, 2008. The contents of the foregoing applications are incorporated herein by reference.

STATEMENT OF GOVERNMENT RIGHTS

This invention was made with government support under DE-FG02-04ER46148 and DE-FG02-04ER 46027 awarded by Department of Energy. The Government has certain rights to this invention.

BACKGROUND

This disclosure is related to magnetic and semiconductor materials, e.g., magnetic material for information storage media, semiconductors for information processing, etc.

Magnetic materials have a wide range of applications, such as being used for storage media. Magnetism is commonly associated with elements containing localized d or f electrons, i.e. the itinerant ferromagnetism. In contrast, the elements containing diffuse sp electrons are intrinsically non-magnetic, but magnetism can be induced in sp-element materials extrinsically by defects and impurities. There have been continuing efforts in searching for new magnetic materials, and much recent interest has been devoted to magnetism of carbon-based, especially graphene-based structures such as graphene nanoribbons and nanoflakes.

Graphene nanoribbons and nanoflakes with "zigzag" edges have been shown to exhibit magnetism. Their magnetization is originated from the localized edge states that give rise to a high density of states at the Fermi level rendering a spin-polarization instability.

SUMMARY OF THE INVENTION

The inventors have realized that magnetic materials may be formed using nanostructures such as superlattices of graphene nanoholes (NHs) (e.g. array of nano-sized holes patterned in a graphene sheet or one or more layers of graphite). Unlike nanoribbons and nanoflakes, the GNH superlattices constitute a family of 2D crystalline "bulk" magnets whose collective magnetic behavior is governed by inter-NH spin-spin interaction in addition to spin coupling within one single NH. They allow long-range magnetic order well above room temperature. The magnetic properties (e.g. the critical temperature for long-range magnetic ordering) of the material depend on the structural properties of the NH lattice (e.g. NH size/shape, NH lattice type/spacing/density, etc.). Accordingly, such magnetic properties can be "tuned" by suitable choice of NH superlattice structure.

The inventors have also realized that semiconductor materials may similarly be formed using NH superlattices. In this case, the electrical properties (e.g. the semiconductor bandgap) of the material depend on the structural properties of the NH lattice. Accordingly, the semiconductor material properties can be "tuned" by suitable choice of NH superlattice structure.

Furthermore, magnetic semiconductors, such as diluted magnetic semiconductors (DMSs) can be formed using a combination of types of nanostructures. For example, as described in detail below, a DMS can be produced by doping, e.g., triangular zigzag NHs into a semiconducting superlattice of, e.g., rhombus armchair NHs.

Such materials offer a new system for fundamental studies of spin-spin interaction and long-range magnetic ordering in low dimensions, and open up the exciting opportunities of making engineered magnetic and/or semiconducting materials with NHs for magnetic storage media, spintronics applications, sensor and detector applications, etc.

A magnetic material is disclosed including: a two-dimensional array of carbon atoms; and a two-dimensional array of nanoholes patterned in the two-dimensional array of carbon atoms. The magnetic material has long-range magnetic ordering at a temperature below a critical temperature Tc.

In some embodiments, Tc is greater than 298° K. In some embodiments, Tc depends on a structural property of the two-dimensional array of nanoholes.

In some embodiments, the two-dimensional array of carbon atoms consists of an open hexagonal array, or an array with any other type of symmetry. In some embodiments, the two-dimensional array of nanoholes includes an array of nanoholes with edges having a zigzag configuration.

In some embodiments, the long-range magnetic ordering is ferromagnetic ordering. In some embodiments, the long-range magnetic ordering is anti-ferromagnetic ordering.

In some embodiments, the two-dimensional array of nanoholes includes a first sublattice of nanoholes and a second sublattice of nanoholes. In some embodiments, the nanoholes of the first sublattice are arranged in a parallel configuration with respect to the nanoholes of the second sublattice. In some embodiments, the nanoholes of the first sublattice are arranged in an anti-parallel configuration with respect to the nanoholes of the second sublattice.

In some embodiments, the array of nanoholes includes at least one from the group of: a triangular shaped nanohole, a rhombus shaped nanohole, and a hexagonal nanohole.

In some embodiments, the array of nanoholes includes a nanohole having a characteristic size of about 50 nm or less, of about 100 nm or less, of about 500 nm or less, of about 1000 nm or less, or of about 5000 nm or less.

In some embodiments, the array of nanoholes has a density greater than about $10^{-4}$ nanoholes per $nm^2$. In some embodiments, the array of nanoholes has a density within the range of about $10^{-8}$ nanoholes per $nm^2$ to about $10^{-2}$ nanoholes per $nm^2$.

In another aspect, a semiconductor material is disclosed including: a two-dimensional array of carbon atoms; and a two-dimensional array of nanoholes patterned in the two-dimensional array of carbon atoms. The semiconductor material has a semiconductor bandgap $\Delta$. In some embodiments, the bandgap $\Delta$ depends on a structural property of the two-dimensional array of nanoholes.

In some embodiments, the two-dimensional array of carbon atoms consists of an open hexagonal array, or an array with any other type of symmetry. In some embodiments, the two-dimensional array of nanoholes includes an array of nanoholes with edges having an armchair configuration.

In some embodiments, wherein the array of nanoholes consists of an array of triangular or rhombus shaped nanoholes.

In some embodiments, $1\ meV \leq \Delta \leq 20\ meV$. In some embodiments, $1\ meV \leq \Delta \leq 2\ eV$.

In another aspect, a diluted magnetic semiconductor is disclosed including: a two-dimensional array of carbon atoms; a two-dimensional array of a first type of nanoholes patterned in the two-dimensional array of carbon atoms; and a two-dimensional array of a second type of nanoholes patterned in the two-dimensional array of carbon atoms. The diluted magnetic semiconductor material has a semiconductor bandgap Δ. The diluted magnetic semiconductor has long-range magnetic ordering at a temperature below a critical temperature Tc. In some embodiments, Tc is greater than 298° K.

In some embodiments, the two-dimensional array of the first type of nanoholes consists of nanoholes having intra-nanohole magnetic ordering. In some embodiments, Tc depends on a structural property of the two-dimensional array of the first type of nanoholes. In some embodiments, the bandgap Δ depends on a structural property of the two-dimensional array of the second type of nanoholes.

In some embodiments, wherein the two-dimensional array of carbon atoms consists of an open hexagonal array, or an array having any other type of symmetry.

In some embodiments, the two-dimensional array of the first type nanoholes includes an array of nanoholes each with edges having a zigzag configuration. In some embodiments, the two-dimensional array of the second type nanoholes includes an array of nanoholes each with edges having an armchair configuration.

In some embodiments, the long-range magnetic ordering is ferromagnetic ordering. In some embodiments, the long-range magnetic ordering is anti ferromagnetic ordering.

In some embodiments, the array of the second type of nanoholes consists of an array of rhombus shaped or hexagonal shaped nanoholes.

In some embodiments, 1 meV≦Δ≦20 meV. In some embodiments, 500 meV≦Δ≦2000 meV.

In another aspect, a magnetic information storage media is disclosed including: a two-dimensional array of carbon atoms, the array including a plurality of magnetic nanostructures, each of the nanostructures being in one of least two available magnetic states. The at least two available magnetic states include a first magnetic state associated with a first memory state; and a second magnetic state associated with a second memory state.

In some embodiments, the plurality of magnetic nanostructures includes a plurality of nanoholes.

In some embodiments, for each of the plurality of nanoholes, the first magnetic state is a state of intra-nanohole antiferromagnetic ordering and the second magnetic state is a state of intra-nanohole ferromagnetic ordering.

Some embodiments include a reader unit adapted to read out the magnetic state of one or more of the plurality of magnetic nanostructures. Some embodiments include a write unit adapted to change the magnetic state of one or more of the plurality of magnetic nanostructures.

In some embodiments, the plurality of nanoholes includes a nanohole having a characteristic size of about 50 nm or less. In some embodiments, the plurality of nanoholes includes a nanohole having a characteristic size in the range of about 50 nm to about 1000 nm. In some embodiments, the plurality of nanoholes has an average density greater than about $10^{-4}$ nanoholes per $nm^2$.

In some embodiments, the first and second magnetic states are stable over a timescale greater than 1 hour.

In another aspect, an apparatus is disclosed including a detector including: a semiconductor material which includes a two-dimensional array of carbon atoms; and a two-dimensional array of nanoholes patterned in the two-dimensional array of carbon atoms, wherein the semiconductor material has a semiconductor bandgap Δ, and wherein the detector is adapted to produce a signal in response to electromagnetic radiation incident on the semiconductor material.

In some embodiments, the bandgap Δ depends on a structural property of the two-dimensional array of nanoholes.

In some embodiments, the detector is adapted to produce a signal in response to electromagnetic radiation incident on the semiconductor material, the radiation having a frequency corresponding to a photon energy at or near the bandgap Δ.

In some embodiments, 1 meV≦Δ≦20 meV, and the detector is adapted to produce a signal in response to electromagnetic radiation incident on the semiconductor material, the radiation having a frequency in the terahertz or far infrared radiation.

In another aspect a magnetic material is disclosed including: a plurality of layers, each including a two-dimensional array of carbon atoms; and a two-dimensional array of nanoholes patterned in at least one of the two-dimensional array of carbon atoms. The magnetic material has long-range magnetic ordering at a temperature below a critical temperature Tc. In some embodiments, Tc is greater than 298° K.

In some embodiments, wherein Tc depends on a structural property of the two-dimensional array of nanoholes.

In some embodiments, the plurality of layers includes a top layer and one or more underlying layers, and the two-dimensional array of nanoholes is patterned in the top layer.

In some embodiments, the two-dimensional array of nanoholes includes an array of nanoholes with edges having a zigzag configuration.

In some embodiments, the one or more underlying layers include bulk carbon, e.g. a highly oriented pyrolytic graphite film.

In another aspect, a magnetic material is disclosed including: a plurality of layers stacked along a vertical direction, each layer including a two-dimensional array of carbon atoms; and a two-dimensional array of nanotunnels patterned substantially vertically through the plurality of layers. The magnetic material has long-range magnetic ordering at a temperature below a critical temperature Tc. In some embodiments, Tc is greater than 298° K.

In some embodiments, Tc depends on a structural property of the two-dimensional array of nanotunnels. In some embodiments, wherein the two-dimensional array of nanoholes includes an array of nanotunnels with edges having a zigzag configuration In some embodiments, the plurality of layers includes bulk carbon, e,g, a highly oriented pyrolytic graphite film.

In another aspect, an apparatus is disclosed including a detector material which includes a two-dimensional array of carbon atoms and a two-dimensional array of nanoholes patterned in the two-dimensional array of carbon atoms. The apparatus also includes a monitor which produces a signal indicative of a change in a physical property of the material in response to a change in a chemical environment of the detector material. In some embodiments, the monitor produces a signal indicative of a change in a transport property of the detector material in response to adsorption of molecules from the chemical environment by the two-dimensional array of nanoholes.

BRIEF DESCRIPTION OF THE DRAWINGS

FIG. 13a shows a perspective view of the FM ground-state in a free graphene sheet.

FIG. 13b shows a top view of the FM ground-state in a free graphene sheet

FIG. 13c shows a perspective view of the FM ground-state in a graphene sheet supported on one layer.

FIG. 13d shows a top view of the FM ground-state in a graphene sheet supported on one layer.

FIG. 13e shows perspective view of the FM ground-state in a graphene sheet supported on two layers of graphite film.

FIG. 13f shows a top view of the FM ground-state in a graphene sheet supported on two layers of graphite film.

FIGS. 14a-b show the FM ground-state magnetic configuration of a triangular nanochannel in graphite film consisting of a 9- and 16-atom nanohole in the A and B layer, respectively. Light colored balls indicate the spin density isosurface at 0.03e/Å3.

FIG. 14a shows a perspective view of the spin density distribution within one supercell.

FIG. 14b shows a top down view of spin density distribution of FIG. 14a looking down through the nanochannel.

FIG. 14c is a plot of the band structure of the nanochannel of FIG. 14a.

DETAILED DESCRIPTION

Figure 1:
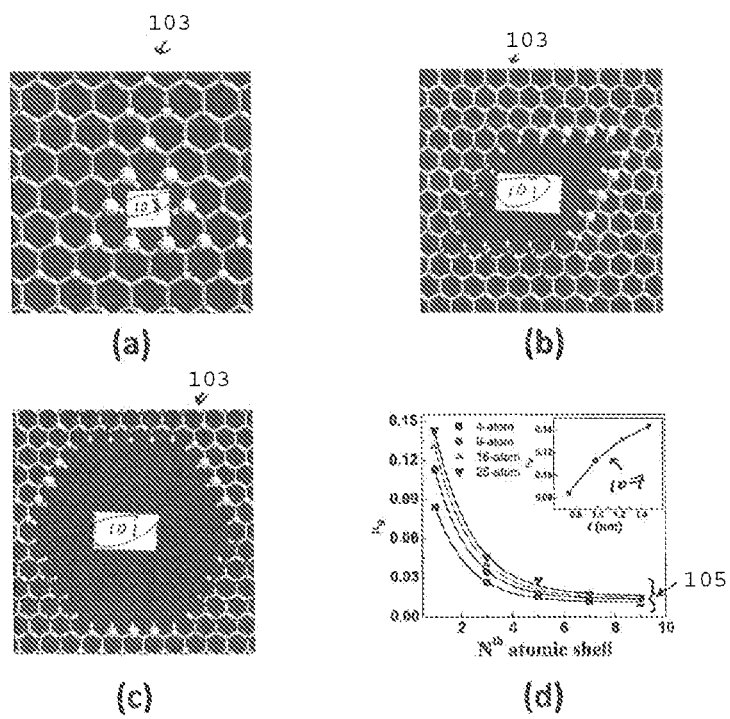
FIG. 1a-1c illustrate magnetism in a single GNH. The ground-state magnetic configurations of different shapes of NHs are shown: (a) FM triangular NH; (b) AF rhombus NH; (c) AF hexagonal NH. In (a-c), light and dark balls indicate the up- and down-spin density isosurface at 0.02e/Å3, respectively; dark and light sticks represent C—C and C—H bonds respectively.
FIG. 1d shows a plot of the average local magnetic moment ($\mu_B$) per atom in the triangular NH (FIG. 1a) as a function of distance moving away from the center of NH, measured in atomic shells with the edge atoms as the first shell. The inset shows $\mu_B$ on the edge vs. NH size (l).

Referring to FIG. 1a through FIG. 1c, in some embodiments, graphene nanoholes 101 (GNHs) made inside a graphene sheet 103 with "zigzag" edges (i.e. edges formed as shown in FIG. 1 in the honeycomb array of the carbon atoms of the graphene sheet), exhibit magnetism. In these Figs., light and dark balls indicate the up- and down-spin density isosurface at 0.02e/Å3, respectively; dark and light sticks represent C—C and C—H bonds respectively.

As described below, an array of such NHs, e.g. as shown in FIGS. 2a and 2b can exhibit collective "bulk" magnetism because inter-NH spin-spin interactions are introduced in addition to the intra-NH spin coupling. Such intra-NH coupling may provide long-range (i.e., over multiple sites in the NH lattice) magnetic ordering (e.g., ferromagnetic or antiferromagnetic ordering). This allows the formation of materials that take advantage of spins within more than just a single nanoribbon or nanoflake. For example, in various embodiments, superlattices composed of a periodic array of NH spins form nanostructured magnetic 2D crystals with the NH acting like a "super" magnetic atom.

Although not intending to be bound by theory, the magnetic properties of GNHs have been studied using first-principles calculations. Considering first a single zigzag NH by examining the intra-NH spin-spin interaction, we found that individual NH can be viewed as an "inverse structure" of nanoflake or nanoribbon, like an anti-flake or anti-ribbon, with similar spin behavior. We determine the ground-state magnetism of three typical NH shapes: triangular (FIG. 1a), rhombus (FIG. 1b) and hexagonal (FIG. 1c), by comparing the relative stability of ferromagnetic (FM), antiferromagnetic (AF) and paramagnetic (PM) configuration as a function of NH size. Our calculations show that the ground state is FM for triangular NHs, but AF for rhombus and hexagonal NHs, and their spin densities are shown in FIGS. 1a, 1b and 1c, respectively. As shown in FIG. 1d the magnetic moments 105 are highly concentrated on the edges and decay quickly away from the edge. Similar decaying behavior has been seen in nanoribbons and nanoflakes. The edge moment 1-7 increases with increasing NH size (FIG. 1d, inset).

Figure 5:
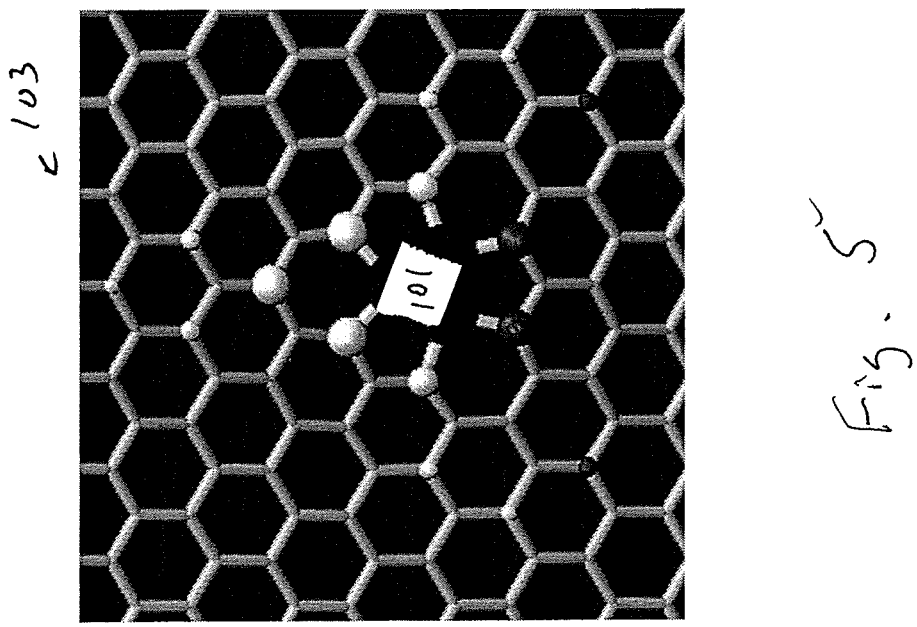
FIG. 5 is a spin-density plot of the ferrimagnetic configuration of a 4-atom triangular NH. Light and dark balls indicate the up- and down-spin density isosurface at 0.02e/Å³ respectively; dark and light sticks represent C—C and C—H bonds respectively.

The triangular NHs have a metastable ferrimagnetic state with two edges having one spin and the other edge having the opposite spin (e.g. as shown in FIG. 5). For a 4-atom NH, the FM state is 52 meV lower in energy than the ferrimagnetic state, and the latter is 13 meV lower than the PM state. For a 32-atom rhombus NH, the AF state is 89.2 meV lower than the PM state; for a 54-atom hexagonal NH, the AF state is 164.4 meV lower than the PM state. The energy difference increases with increasing NH size. The triangular NHs favor FM at all sizes, whereas rhombus and hexagonal NHs only become AF when the edge has more than five atoms, i.e. they are PM if the NH is too small. So, the triangular NHs have a stronger tendency toward magnetization.

The magnetic ordering within a single NH is consistent with both the theorem of itinerant magnetism in a bipartite lattice and the topological frustration model of the $\pi$-bonds counting the unpaired spins in the nonbonding states. The honeycomb (i.e. open hexagonal) array of a graphene sheet may be considered to be composed of two sublattices of carbon atoms. For such a system consisting of two atomic sublattices, each sublattice assumes one spin and the total spin S of the ground state equals $\frac{1}{2}|N_B-N_A|$ where $N_B$ ($N_A$) is the number of atoms on B (A) sublattice. Because of the honeycomb lattice symmetry, atoms on the same zigzag edge belong to the same sublattice; while atoms on two different zigzag edges belong to the same sublattice if the two edges are at an angle of 0° or 60°, but different sublattices if at an angle of 120° or 180°. Consequently, the triangular NH are FM, because all edges are on the same sublattice; the rhombus and hexagonal NHs are AF, because one-half the edges are on the A-sublattice and another half on the B-sublattice. Note, this same argument can be applied to nanoribbons and nanoflakes.

Figure 6:
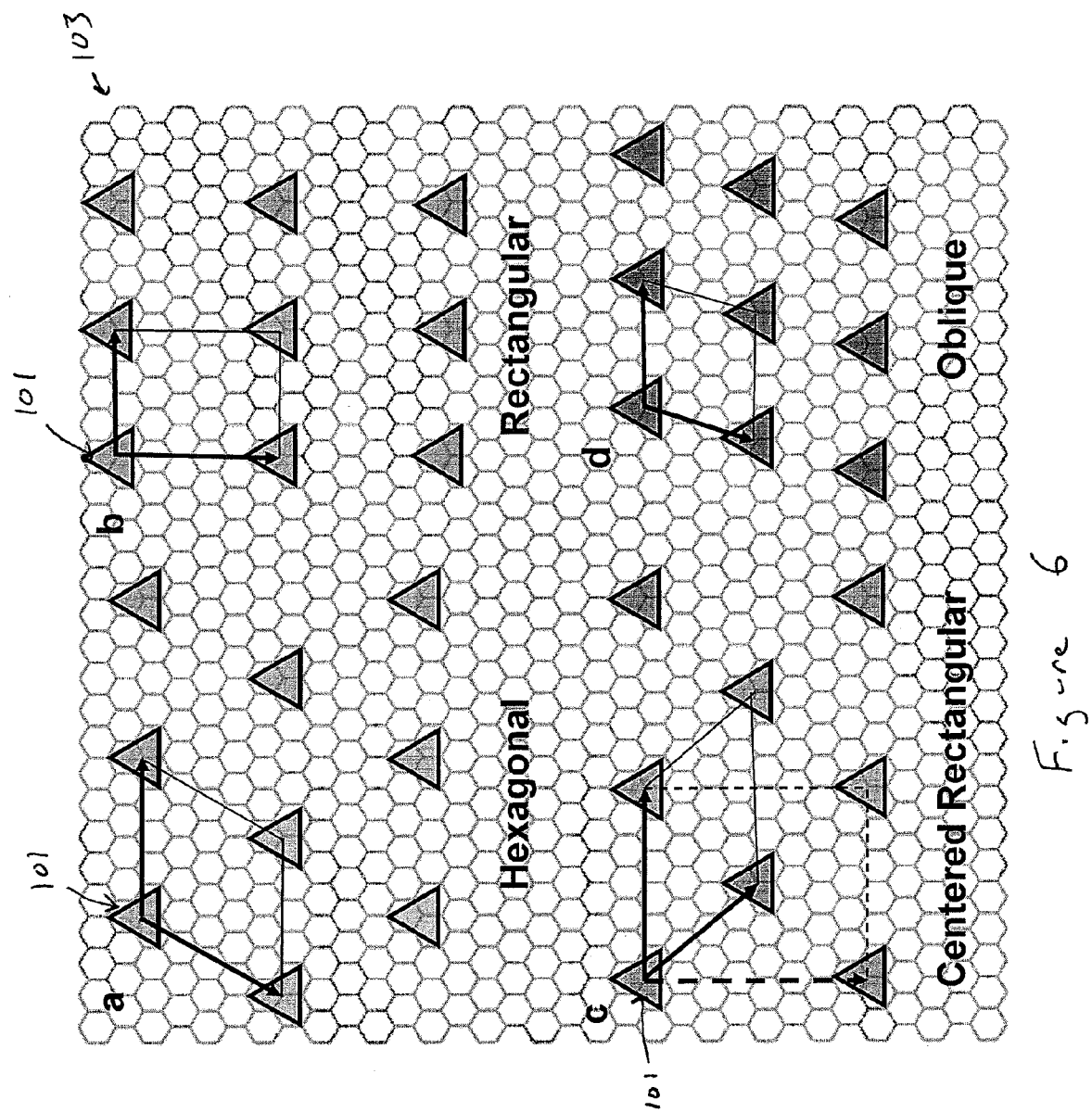
FIG. 6 is a schematic illustration of four possible types of Bravais lattice of GNHs that can be patterned in graphene. Solid arrows and lines mark the primitive cells. (a) hexagonal lattice; (b) rectangular lattice; (c) centered rectangular lattice; the dashed lines mark the conventional cell; (d) oblique lattice.

Next, we consider GNH superlattices (a periodic array of NHs in graphene) by examining the inter-NH spin-spin interaction. Referring to FIG. 6, one can generate four out of five possible 2D Bravais lattices of NHs 101 in a graphene sheet 103.

Figure 2:
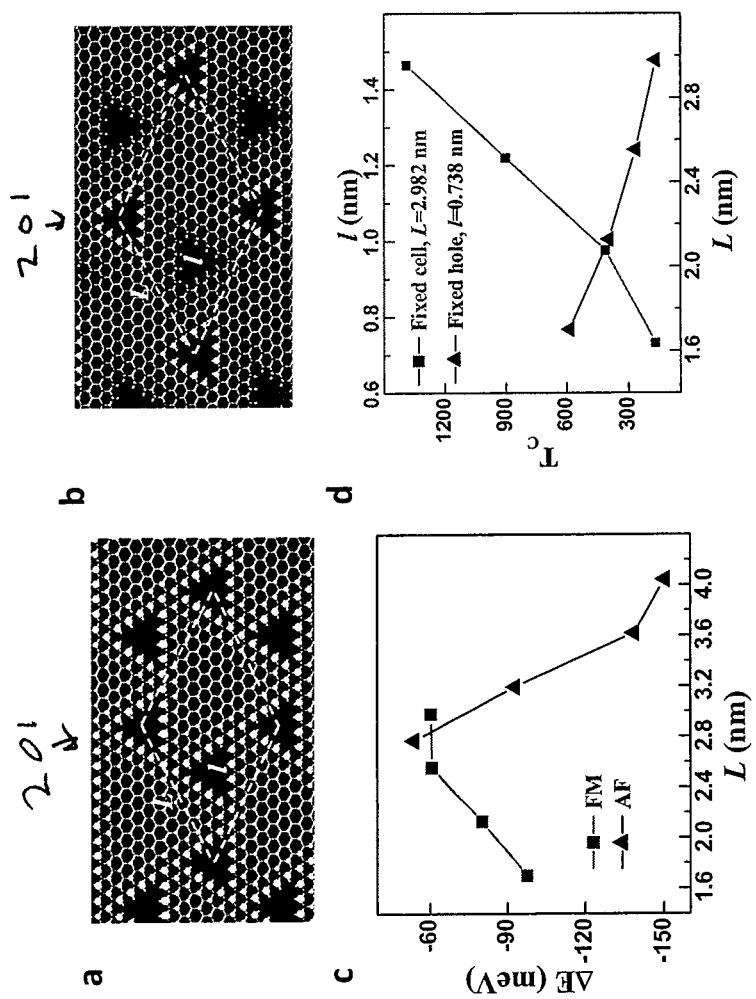
FIG. 2a shows ground-state spin configurations in a FM honeycomb NH superlattice. All the symbols and notations for bonds and spin densities are the same as FIG. 1. Dashed lines mark the primitive cell.
FIG. 2b shows ground-state spin configurations in a AF superlattice. All the symbols and notations for bonds and spin densities are the same as FIG. 1. Dashed lines mark the primitive cell.
FIG. 2c shows a plot of $\Delta E_{pc}=E(FM)-E(PM)$ of the FM superlattice of FIG. 2a and $\Delta E_{ac}=E(AF)-E(PM)$ of the AF superlattice of FIG. 2b versus cell dimension (L).
FIG. 2d shows a plot of Curie temperature of the FM superlattice in FIG. 2a as a function of NH size (l) and cell dimension (L).

Referring to FIG. 2, in embodiments featuring honeycomb superlattices 201 of triangular NHs (FIGS. 2a and 2b), each NH possesses a net moment acting effectively as "one" spin. The superlattice contains two sublattices of NHs, superimposed on the background of graphene containing two sublattices of atoms. NHs on the same sublattice are FM-coupled because their corresponding edges are at 0° to each other so that their edge atoms are on the same atomic sublattice. On the other hand, the NHs on different sublattices are FM-coupled if they are in a parallel configuration (FIG. 2a) but AF-coupled if they are in an antiparallel configuration (FIG. 2b) when their corresponding edges are at 180° to each other so that their edge atoms are on different atomic sublattices. This behavior has been confirmed by our first-principles calculations.

Figure 7:
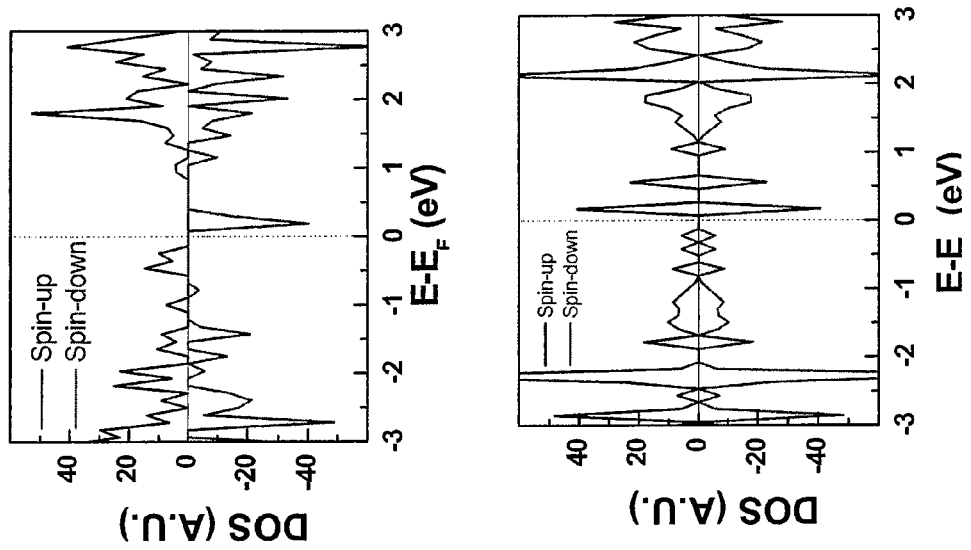
FIG. 7 plots the density of states (DOS) of GNH superlattices. Upper panel: DOS of a FM superlattice containing two parallel NHs (FIG. 3a). Lower panel: DOS of an AF superlattice containing two antiparallel NHs (FIG. 3b). Note the small gap at Fermi energy.
Figure 8:
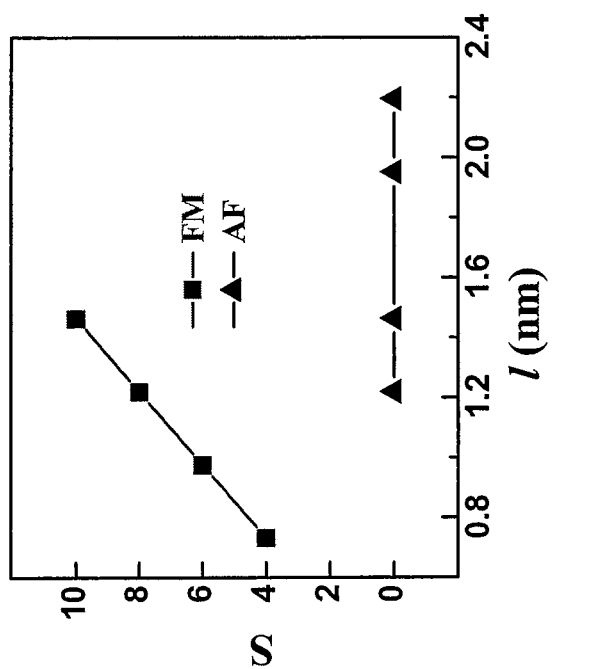
FIG. 8 Is a plot of the total spin (S) within one unit cell of GNH superlattices. Squares show S of FM superlattices containing two parallel NHs (FIG. 3a), and triangles show S of AF superlattices containing two antiparallel NHs (FIG. 3b) as a function of NH size (l).

Independent of NH size and supercell dimension, the FM state is favored for parallel configurations but the AF state is favored for antiparallel configurations. In both cases, the spin-polarization splits the edge states opening a gap at the Fermi energy (illustrated in FIG. 7). The total spin S in one unit cell equals to $\frac{1}{2}|N_B-N_A|$. It increases linearly in the FM parallel configuration but remains zero in the AF antiparallel configuration with increasing NH size (illustrated in FIG. 8).

Figure 9:
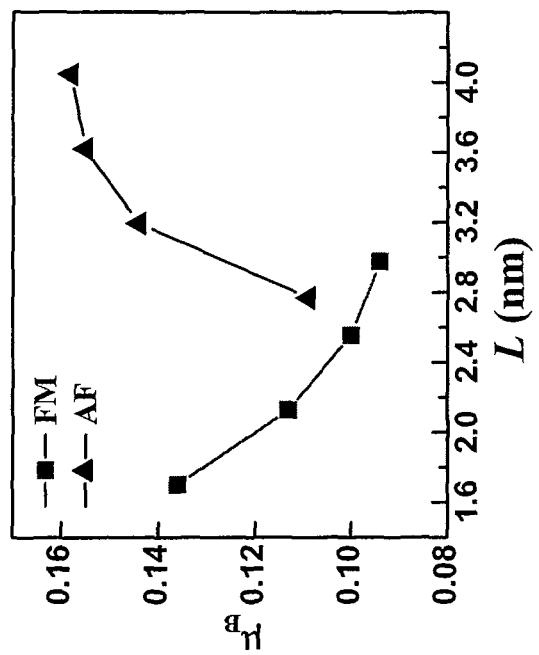
FIG. 9 Is a plot of Average magnetic moment on the NH edge ($\mu_B$) as a function of cell size (L). Squares show $\mu_B$ in the FM (FIG. 3a) lattices with fixed hole size (l=0.738 nm), and triangles show $\mu_B$ in the AF (FIG. 3b) lattices with fixed hole size (l=1.476 nm).

The collective magnetic behavior of a GNH superlattice depends on inter-NH spin-spin interaction. There exists super exchange interaction between the NH spins, in addition to the spin coupling defined by the underlying bipartite lattice. In FIG. 2c, we plot $\Delta E_{pc}=E(FM)-E(PM)$ for the FM parallel configuration and $\Delta E_{ac}=E(AF)-E(PM)$ for the AF antiparallel configuration as a function of cell dimension (L), i.e., the NH-NH separation. $|\Delta E_{pc}|$ increases while $|\Delta E_{ac}|$ decreases with decreasing L. This indicates that as the NHs move closer to each other, the FM state becomes relatively more stable, i.e. the FM coupling is favored by the super exchange interaction. Also, the edge magnetic moments are found to increase in the FM but decrease in the AF configuration with decreasing L (FIG. 9), reflecting that the edge magnetization on the neighboring NHs is enhanced with the same spin but suppressed with the opposite spin by the super exchange interaction.

The above results show that long-range ferromagnetic ordering can be created by employing the parallel configuration of triangular NHs in different lattice symmetries (e.g. as shown in FIG. 6). Again, while not intending to be bound by theory, the Curie temperature ($T_c$), below which long-range magnetic ordering occurs, has been estimated using the mean-field theory of Heisenberg model, $$T_c = \frac{2\Delta}{3k_B}, \qquad (1)$$

Where $\Delta$ is the energy cost to flip one "NH spin" in the FM lattice, which have been calculated directly from first principles for the honeycomb lattices (e.g. as shown in FIG. 2a). For example, FIG. 2d shows that $T_c$ increases from 169 K to 1388 K when NH size (l) increases from 0.738 to 1.476 nm with cell dimension (L) fixed at 2.982 nm, and decreases from 586 K to 169 K when L increases from 1.704 nm to 2.982 nm with l fixed at 0.738 nm. These trends are expected since magnetization is stronger for larger NH size and higher NH density. Calculations confirm that FM GNH superlattices may be produced with $T_c$ above room temperature by using a NH size of ~50 nm and a density of $10^{-4}$ nm$^{-2}$, achievable by today's lithographic patterning technology. We note that a recent experiment[25] has shown a $T_c \gtrsim 350$ K in FM graphite made by proton bombardment.

Figure 3:
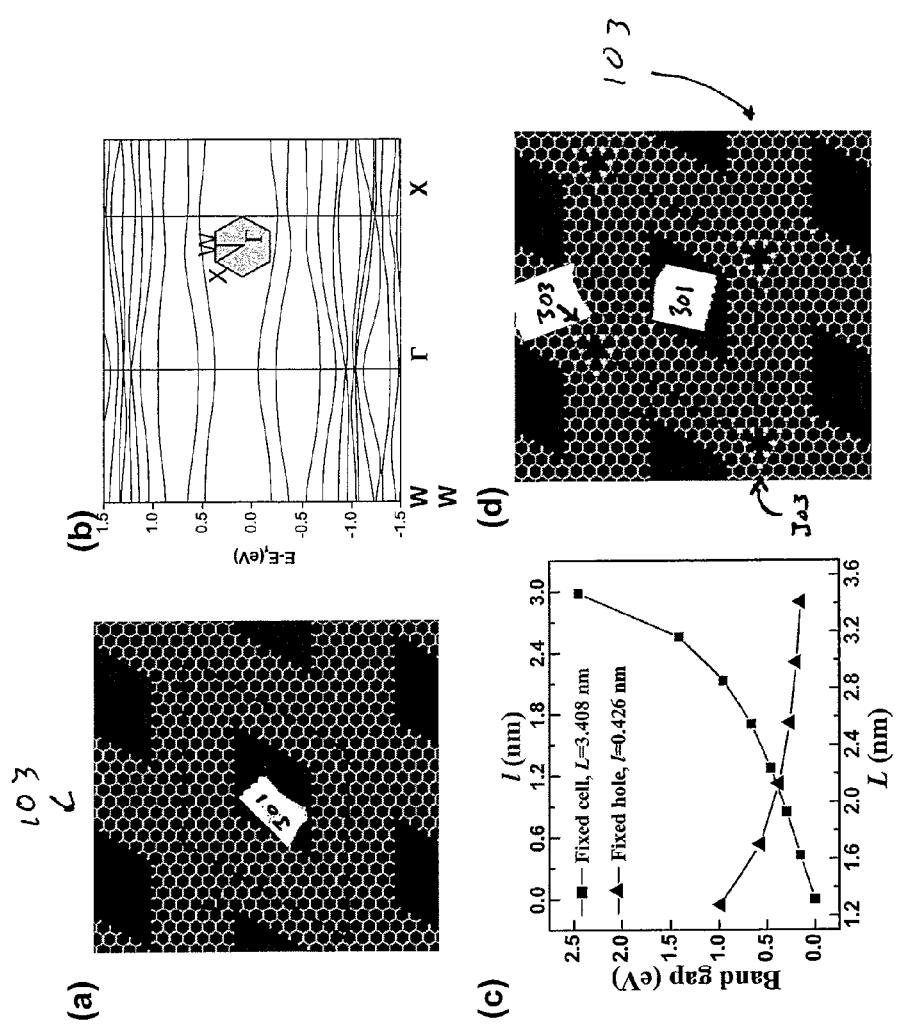
FIG. 3a shows a semiconductor GNH hexagonal lattice (L=8 a, a=2.46 Å is the lattice constant of graphene) of an array of rhombus armchair NHs (l=4 a). All the symbols and notations for bonds and spin densities are the same as FIG. 1.
FIG. 3b shows the band structure of the semiconductor GNH hexagonal lattice of FIG. 3a. The inset shows the Brillouin zone.
FIG. 3c shows the TB band gap of a semiconductor GNH hexagonal lattice of the type shown in FIG. 3a as a function of NH size (l) and cell dimension (L).
FIG. 3d illustrates a magnetic semiconductor made by doping the structure shown in FIG. 3a with triangular zigzag NHs. All the symbols and notations for bonds and spin densities are the same as FIG. 1.

In various embodiments, graphene-based nanostructures may be used in electronics applications. For example, in some embodiments, GNH magnetism provides for combining magnetic and semiconducting behavior in one material system. For example, diluted magnetic semiconductors (DMS) may be produced by exploiting GNHs with two different kinds of edges. Similar to superlattices of zigzag edge NHs, superlattices of NHs with edges in the "armchair" configuration may be produced which constitute a class of 2D semiconductors. Referring to FIG. 3a, the armchair edge configuration is formed as shown in the edges of NHs 301 the honeycomb array of the carbon atoms of the graphene sheet 103.

FIG. 3b shows the semiconductor band structure of a superlattice of rhombus armchair NHs (as shown in FIG. 3a) having a direct band gap of 0.43 eV, as obtained from first-principles calculations. FIG. 3c shows the band gap as a function of NH size (l) and cell dimension (L), from tight-binding calculations. The gap increases with increasing l but decreases with increasing L.

In some embodiments, e.g. as shown in FIG. 3d a DMS can be made by adding triangular zigzag NHs 301 into a semiconductor superlattice of armchair NHs 301. In the embodiment shown, to provide the ferromagnetism the triangular NHs 303 are arranged parallel with each other acting like magnetic dopants.

Prior art DMS materials are synthesized by mixing two different materials, typically III-V semiconductors and transition-metal magnetic elements. The main challenge is to increase the magnetic dopant concentration in order to raise the Curie temperature (or Neel temperature in the case of antiferromagnetism, or critical temperature, generally), because the two types of materials are usually not miscible. In contrast, the material described herein is an "all-carbon" DMS (i.e. composed of an array of carbon atoms, with, for example, hydrogen bonds located only on the edges of superimposed NHs) in which combined semiconductor and magnetic behavior are achieved by structural manipulation. Consequently, room-temperature DMS are reachable because the dopant concentration can be increased without the miscibility problem. In alternative embodiments, other magnetic elements may be doped into the semiconducting GNH superlattice.

Figure 4:
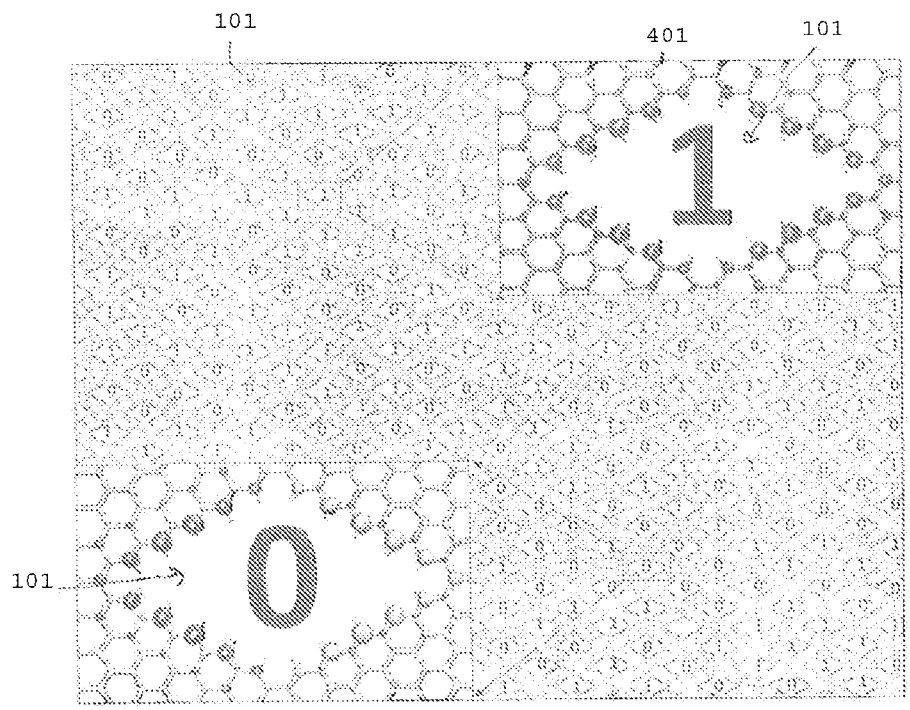
FIG. 4 illustrates a magnetic storage medium consisting of a patterned array of rhombus GNHs. The insets show the detailed structure of "0" and "1" bit, represented by the ground-state AF configuration (S=0) and the excited FM configuration (S=N), respectively. Dark and light balls show the spin-up and spin-down density respectively at an isosurface value of 0.02 e/Å³.

In various embodiments, engineered magnetic materials with NHs may be employed for various applications. For example, referring to FIG. 4 it is possible to directly pattern NHs into engineered magnetic storage media. These NHs may serve essentially the same function as magnetic domains found in conventional magnetic storage material, with the magnetic state of each NH encoding a piece of information. The NHs may be addressed and manipulated using any suitable techniques, e.g. those known in the field of magnetic storage media.

For example, as noted above, the ground state of a rhombus zigzag NH is AF (FIG. 1b and FIG. 4, lower-left inset) and its first excited state is FM (FIG. 4, up-right inset) when the NH size is larger than 14.6 Å. Taking each of an array of such NHs as one bit, we can assign the ground state with "S=0" and the excited state with "S=N" to represent the '0' and '1', respectively. The switching between '0' to '1' can be done by applying a local magnetic field or energy pulse to convert between the ground and the excited state. Using a NH size of ~50 nm and a density of $10^{-4}$ nm$^{-2}$, a storage density about 0.1 terabit per square inch is achievable, much higher than the current density in use.

Note that, in typical embodiments, the magnetocrystalline anisotropy around individual NHs should be larger than $k_BT$ for the proposed storage media to work (where T is the operating temperature). However, this limitation can be easily satisfied at room temperature for the examples given above, and for many other practical systems.

As noted above, NH lattice semiconductor material may be provided, e.g., using an array of armchair rhombus NHs. The semiconductor band gap for such material depends on the structural features of the NH lattice (e.g., NH size, NH shape, NH lattice density, etc.). Accordingly, the bandgap can be "tuned" to a desired size by a suitable choice of structural features. For example, NH superlattice semiconductor material may be constructed using currently available techniques with bandgaps of a few meV to a few tens of meV. Few natural materials are available with bandgaps in this energy range, which corresponds to the photon energy of electromagnetic radiation in the far infrared and terahertz range. It is therefore difficult and/or costly to produce semiconductor devices which efficiently emit or detect radiation in this frequency range.

Figure 10:
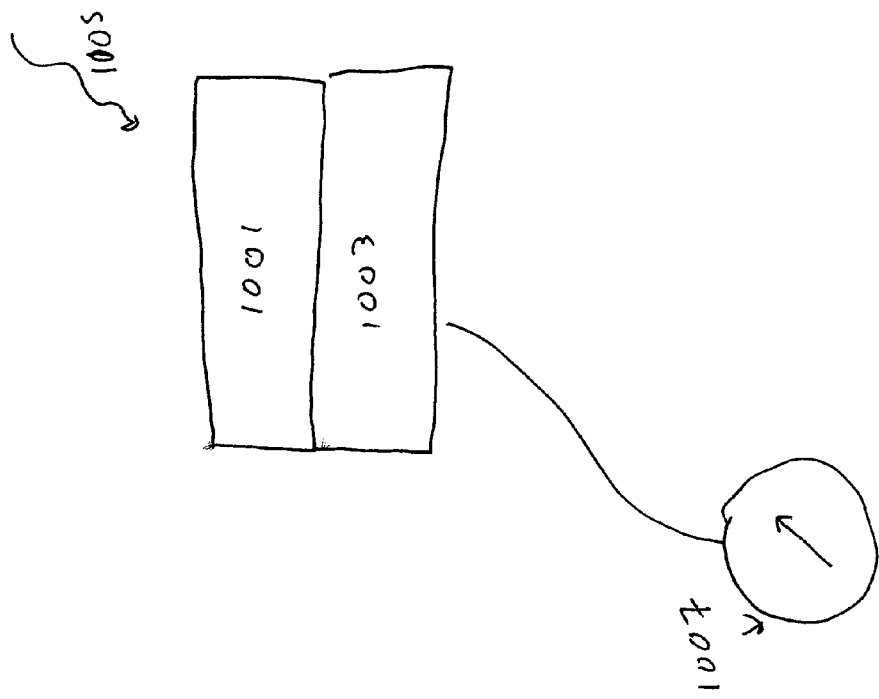
FIG. 10 is a schematic of a detector.

In various embodiments, a NH superlattice semiconductor material having a bandgap tuned to this range may be incorporated into emitter and/or detector devices using techniques known in the art to provide emitters and/or detectors operable in the terahertz and/or far infrared (or other desired range). For example, Referring to FIG. 10, a graphene sheet 1001 containing a tuned bandgap semiconductor NH superlattice (not shown) may be chemically bonded to a further material 1003. Radiation 1005 incident on the NH superlattice with a frequency at or near the tuned band gap of sheet 1001 would excite the superlattice, resulting in changes of the chemical properties of the bonded material. Radiation at or near the bandgap is thereby detected by monitoring the chemical properties of the bonded material with monitor 1007. In general, in various embodiments, radiation at or near the bandgap can be detected by monitoring for changes in, for example, the electrical, chemical, mechanical, optical, or other properties of the NH lattice and/or materials interacting with the NH lattice. In some embodiments, the NH semiconductor materials may also include a magnetic NH superlattice as described above. The structure of the magnetic NH lattice can be chosen to additionally allow tuning of the magnetic properties of the material (e.g. the critical temperature for long-range magnetic ordering).

Figure 11:
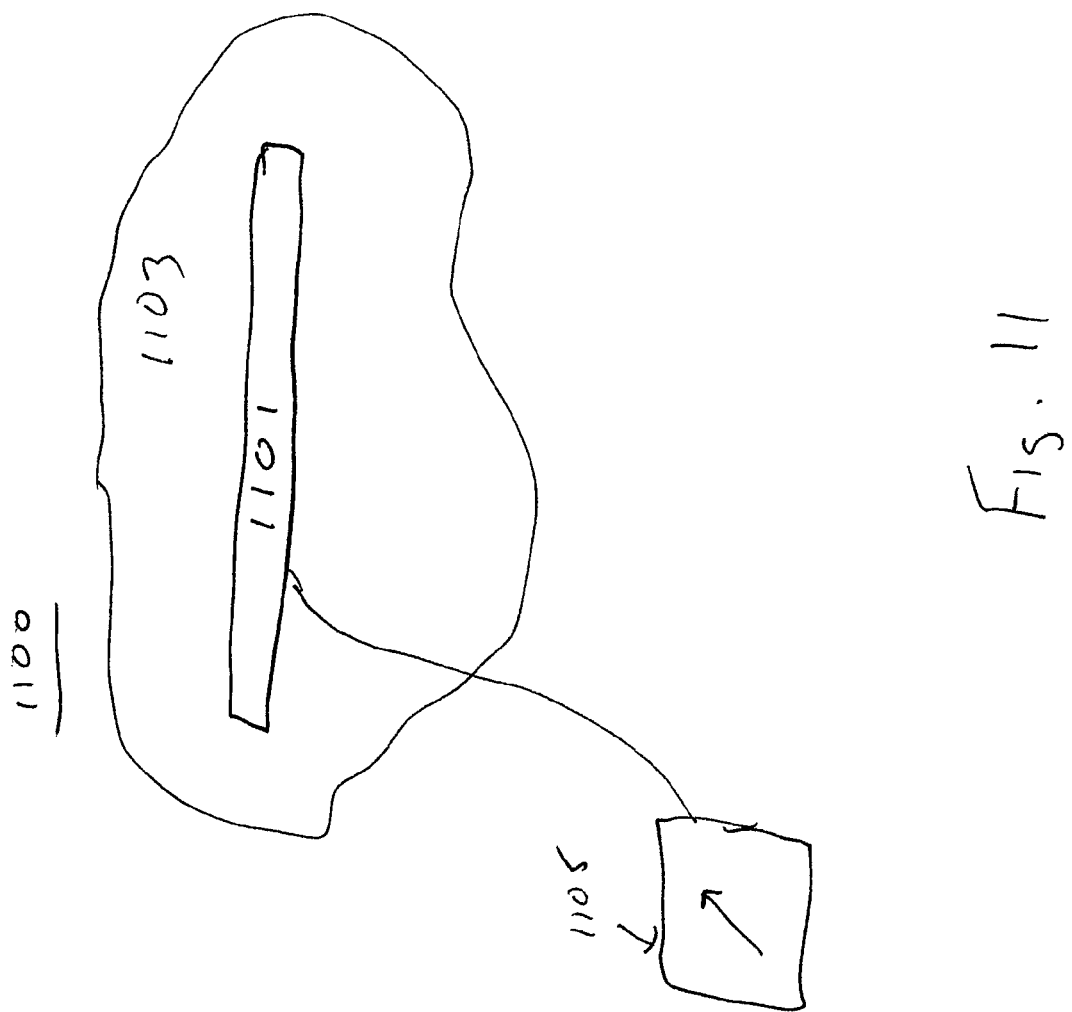
FIG. 11 is a schematic of a detector.

Referring to FIG. 11, sensor 1100 includes a graphene sheet 1100 including a NH array of one or more of the types described herein. The nanohole array interacts with chemical environment 1103. Monitor 1105 detects changes in the chemical environment based on changes on one or more physical properties of sheet 1101 (or one or more materials bonded to or otherwise interacting therewith). For example, in some embodiments monitor 1105 may measure transport changes in response to adsorption of molecules in chemical environment 1103 by the NH array of sheet 1101.

First-principles calculations for the simulations and examples described above were performed using the pseudopotential plane-wave method within the spin-polarized generalized gradient approximation as implemented in the Vienna Ab-initio Simulation Package (VASP) code[30] known in the art. We used a rhombus supercell in the graphene plane with the cell size ranging from 14×14 Å to 41×41 Å and a vacuum layer of ~10 Å. We used a 2×2×1 k-point mesh for Brillouin zone sampling and a plane wave cutoff of 22.1 Rd. The systems contain up to a maximum of 530 atoms. All the carbon atoms on the edge with dangling bonds are terminated by hydrogen atoms. The system is relaxed until the force on each atom is minimized to less than 0.01 eV/Å.

For calculating Curie temperatures, we used larger cells containing up to eight NH spins, and we found the results are not very sensitive to cell size, suggesting the nearest-neighbor NH-NH interactions dominate.

Tight-binding band structure calculations for semiconductor armchair GNH superlattices were performed using the nearest-neighbor π-band model with the hopping parameter γ=3.0 eV.

Note that while the illustrations above describe NH lattices embedded in a graphene sheet, any of the materials above may be formed in other suitable materials. In various embodiments, NH superlattices of the types described above may be formed in one or more or layers (e.g. a surface layer) of bulk graphite. In the case where the nanoholes extend through multiple layers, they may be referred to as nanochannels.

For example, highly oriented pyrolytic graphite (HOPG) is made up of alternating, nearly defect free graphene planes exhibiting honeycomb array structures directly analogous to that found in the graphene sheets described above. NH or nanochannel arrays may be patterned in one or more of these layers to produce any of the materials, structures, or devices described above.

For example, while not wishing to be bound by theory, first principles calculations indicate that many of the zigzag edge-induced magnetic properties in GBNs exist also in nanopatterned graphite films (NPGFs). Because graphite film is readily available, we propose that for certain applications the NPGFs may be used as a better candidate of magnetic nanomaterials than the GBNs to circumvent the difficulties associated with graphene synthesis.

Figure 12:
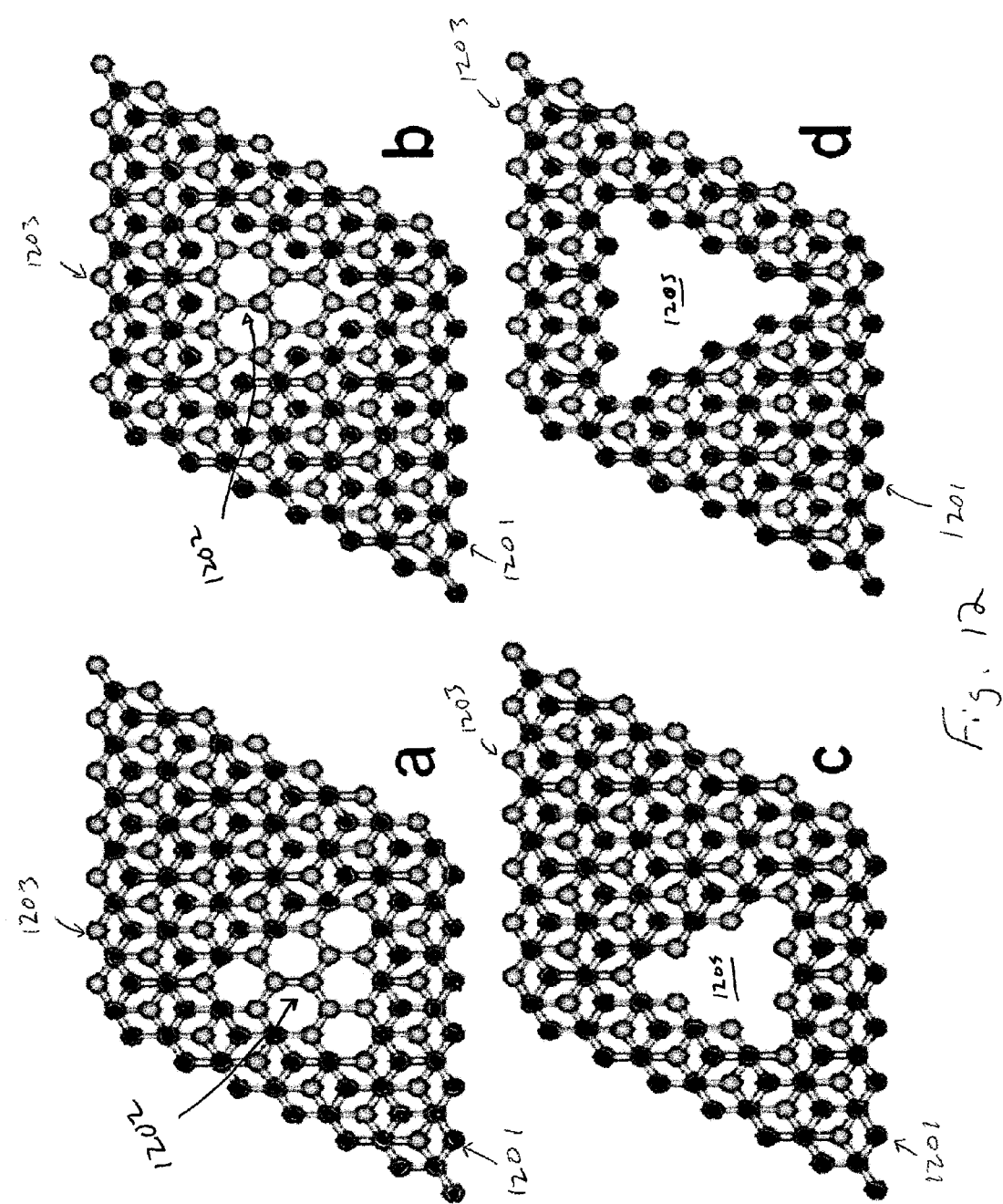
FIG. 12a is an illustration of atomic structure of supported nanoholes featuring a 9-atom up-triangular nanohole in a first whose edge atoms each sit on top of an atom in the second layer. Carbon atoms are shown as dark balls in the first layer and light balls in the second layer.
FIG. 12b is an illustration of atomic structure of supported nanoholes featuring 9-atom down-triangular nanohole whose edge atoms sitting above the center of hexagon in the second layer. Carbon atoms are shown as dark balls in the first layer and light balls in the second layer.
FIG. 12c is an illustration of atomic structure of an up-triangular nanochannel with a 9-atom nanohole in the first layer and a 4-atom nanohole in the second layer. Carbon atoms are shown as dark balls in the first layer and light balls in the second layer.
FIG. 12d is an illustration of atomic structure of a down-triangular with a 9-atom nanohole in the first layer and a 16-atom nanohole in the second layer. Carbon atoms are shown as dark balls in the first layer and light balls in the second layer.

To illustrate our point, we consider two limiting cases of NPGFs: one with only the top atomic layer 1201 patterned with nanoholes 1202 like a GBN supported on a graphite substrate represented by underlying layer 1203 (as shown in FIGS. 12a & 12b), and the other with all the atomic layers 1201, 1203 in the graphite film patterned throughout like a nanochannel 1205 in graphite film (as shown in FIGS. 12c & 12d). As an example, we focus on studying the magnetic properties of triangular nanoholes with zigzag edges. In both cases, we found such nanoholes in graphite film exhibit a FM ground state having a very similar behavior as those in graphene.

For the triangular nanoholes supported on the graphite substrate, we consider two atomic configurations: one is a up-triangle as shown in FIG. 12a where each edge atom of nanohole 1202 sits on top of an atom in the second layer 1203, the other one is a down-triangle as shown in FIG. 12b where each edge atom of nanohole 1202 sits above the center of the hexagon in the second layer. For triangular nanochannels 1205 going through the whole graphite film, to maintain the zigzag edges of nanohole in each layer, the size of nanohole in one layer 1201 must be different from that in the underlying layer (i.e. the graphite film has a ABAB . . . two-layer stacking). FIG. 1c shows an example of up-triangular channel 1205 in which the top layer (let's A layer) has a 9-atom hole (removing 9 atoms) and the bottom B-layer has a 4-atom hole. FIG. 1d shows an example of down-triangular channel 1205 in which the top A-layer has a 9-atom hole and the bottom B-layer has a 16-atom hole. Note, however, the up-triangular nanochannel 1205 in FIG. 1c and the down-triangular nanochannel 1205 in FIG. 1d are actually the same channel structure of different size if one switches the A layer with the B layer (i.e reverses the vertical order of layers 1201 and 1203).

The above described NPGF first principles calculations were performed using the pseudopotential plane-wave method within the spin-polarized generalized gradient approximation. To model the supported nanoholes 1202, we used supercells consisting of one and two layers of substrate film plus a vacuum layer of 11.13 Å (see FIG. 13); to model the nanochannels 1205, we used supercells consisting of periodic stacking of AB layers as in graphite film (see FIG. 14). For both cases, we varied the nanohole size from 4- to 16-atom hole in two different sizes of rhombus supercells with a basal plane of 7a×7a (FIG. 1) and 9a×9a, where a is the graphite lattice constant. We used the theoretically determined lattice constant a=2.46 Å and interlayer spacing of 3.35 Å. The largest system contains up to 324 atoms. We used a plane wave cutoff of 22.1 Rd. All the edge atoms are saturated with H and the atomic structure is optimized until forces on all atoms are converged to less than 0.01 eV/Å. For Brillouin zone sampling, we used a 2×2×1 k-point mesh for the case of supported nanoholes and a 2×2×4 mesh for nanochannels, respectively.

Triangular nanoholes were chosen because it is known such nanoholes have a ferromagnetic (FM) ground state in graphene, as shown in FIGS. 13a and 13b. According to the simple geometric designing rule, any two zigzag edges in graphene are FM-coupled if they are at a formal angle of 0° or 120° and AF-coupled if at an angle of 60o or 180o. Since the three edges in the triangular nanohole are at 120° to each other, they must belong to the same sublattice (A or B) and hence are FM-coupled in consistent with the itinerant magnetism model in a bipartite lattice.

The supported triangular nanoholes 1202 have essentially the same behavior, as shown in FIGS. 13c-13f. They all have a FM ground-state. For the supported 4-atom triangular nanohole in FIG. 13c, the FM sate is found to be ~17.8 meV lower than the PM state. In fact, the ground-state magnetic configurations of the supported nanoholes are almost identical to those of the corresponding nanoholes in free graphene sheet, as one compares FIGS. 13c and 13e to FIG. 13a, and FIGS. 13d and 13f to FIG. 13b. The magnetic moments are largely localized on the edge atoms and decay exponentially moving away from the edge. The calculated total magnetic moment within one unit cell is also found equal to $N_B - N_A$ as predicted from the itinerant magnetism model in bipartite lattice [15], where $N_B$ ($N_A$) is the number of atoms on the B-sublattice (A-sublattice) within one unit cell. Consequently, the moment increases with the increasing nanohole size.

The above results indicate that, in some embodiments, the underlying substrate (graphite film) has a negligible effect on the magnetism of nanoholes in the top "graphene" layer. The magnetism is originated from the localized edge state from the broken sp2 type of bonding in the top graphene layer. The edge state is not expected to be affected much by the underlying graphite layer as there exists no strong interlayer "chemical" bonding except weak Van de Waals interaction between the top layer and underneath film. For the same reason the magnetic behavior of supported up-triangles are identical with that of down triangles although their edge atoms have a different atomic configuration in relation to the layer below (FIG. 12a vs. 12b).

Also, the above results suggest that despite the fact that the electronic structure of graphene is distinctly different from that of graphite film, such as the band structure, the structural defect-originated (or edge-originated) magnetic structure in graphene can be very similar (in the above case almost identical) to that of graphite film. These findings indicate that one may use NPGFs for creating the similar nanomagnetic structures to those produces with NH arrays formed in graphene sheets. For example, graphene nanohole superlattices described above for use as magnetic storage media. One may pattern such nanohole superlattices in the top layer of a graphite film without the need of going through the synthetic process of generating graphene.

Figure 13:
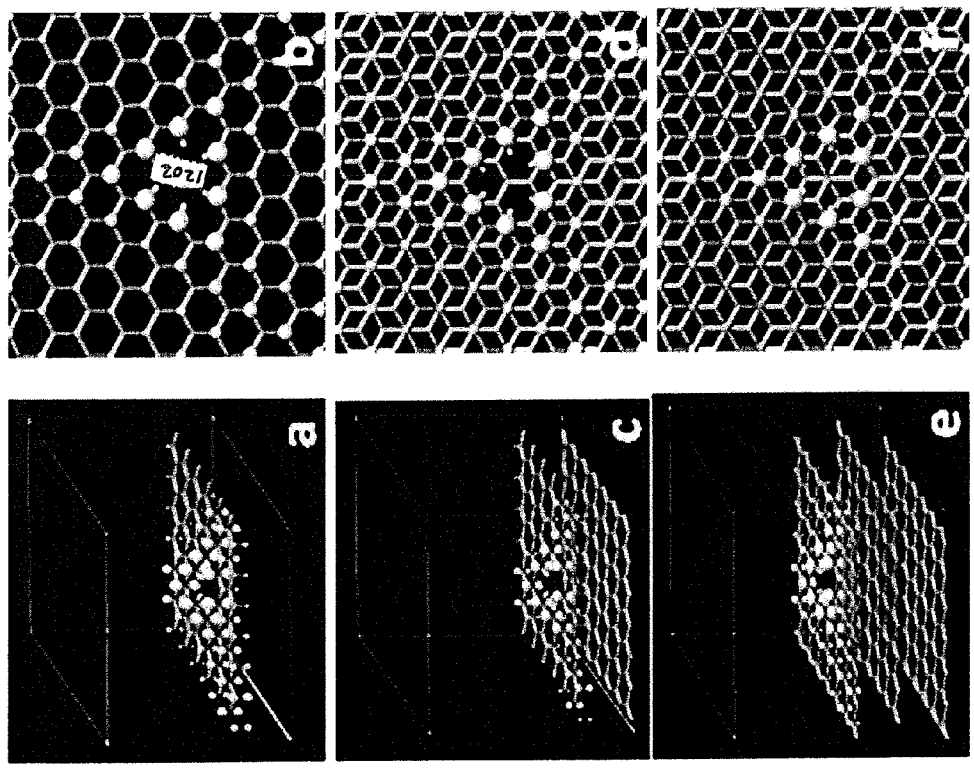
FIGS. 13a-f illustrate the FM ground-state magnetic configuration of a 4-atom triangular nanohole in free and supported graphene. Light colored balls indicate the spin density isosurface at 0.03e/Å3.
Figure 14:
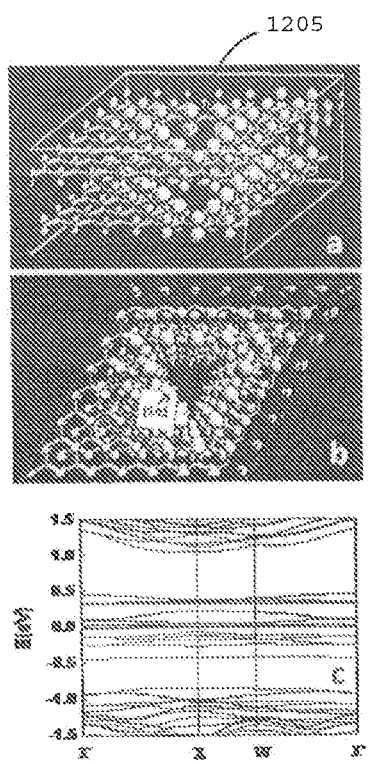

In some embodiments, more than one layer of graphite film will be patterned through at the same time, forming nanochannels 1205. We have calculated the magnetic properties of nanochannels 1205 (for the calculation, taken to be an "infinite" number of stacked nanoholes) in a graphite film, as shown in FIG. 14. This "infinite" case represents the other limiting case opposite to the case of one layer of nanohole supported on the graphite film (e.g. as shown in FIG. 13).

Again, we found all the triangular nanochannels have a FM ground state, as illustrated by the ground-sate spin-density plots of a nanochannel in FIGS. 14a and 14b. For this particular nanochannel, the FM state is calculated to be ~24 mev/unit cell lower than the AF state and ~56.3 mev/unit cell lower than the PM state. The overall magnetic behavior of individual nanoholes in the nanochannel is similar to that of nanoholes in a single graphene layer (either free or supported). The magnetic moments are mostly localized at the edge and decay away from the edge. The total moments increase with the increasing nanochannel size or nanohole size in each layer for the fixed cell size, and decrease with the increasing cell size or decreasing nanochannel density for the fixed nanochannel size.

However, quantitatively we found in a nanochannel the total moments around a nanohole in each layer of graphite film no longer equals to $N_B$-$N_A$ within the layer. This indicates there exist some magnetic interaction between the moments in the different layers, although the nature of this interaction is not clear. From the practical point of view, such quantitative variation is not that important as long as the FM ground state is retained in the nanochannel so that desirable magnetic nanostructures, such as nanohole superlattices can be created by nanopatterning of graphite films even though multiple layers of patterned films are involved.

FIG. 14c shows the band structure of the nanochannel 1205 of FIG. 14a. One interesting point is that, in this case, the "infinite" nanochannel 1205 is metallic, which is distinctly different from that of a nanohole in graphene which is a semiconductor. The band gap opening in a graphene nanohole is caused by spin polarization which makes the on-site energy of the spin-up A-edge state differ from that of the spin-down B-edge state. In a nanochannel, the interlayer interaction broadens the distribution of the on-site energies of A- and B-edges making the spin-up A edge states (bands) overlap with the spin-down B-edge bands, closing up the band gap.

Several experiments have observed magnetism in nanographite-based fiber, all-carbon nanofoam, and proton irradiated graphite. It is believed that the magnetism in these nanostructures is originated from the intrinsic properties of carbon materials rather than from the magnetic impurities. The edge magnetism we discuss here provides one possible origin of all carbon-based nanomagnetism.

The above demonstrates that graphite films can become an all-carbon intrinsic magnetic material when nanopatterned with zigzag edges, using first-principles calculations. The magnetism in NPGFs may be localized within one patterned layer or extended throughout all the patterned layers. It is originated from the highly localized edge states in analogy to that in GBNs. Because graphite film is readily available for mass production, for some applications the NPGFs can be superior for many applications that have been proposed for GBNs.

The NH lattice structures described above can be produced using any suitable fabrication know in the art. For example, a graphene sheet (or HOPG layer, etc.) may be patterned with one or more NH arrays using conventional photolithography techniques. As is well known in the art, a photolithographically patterned mask is formed on the sheet, exposing only the areas where NHs are desired. The NHs are then formed by, for example, particle (electron, proton, ion, etc) bombardment, chemical processes such as etching, etc. The mask layer is then removed, leaving behind the graphene sheet (or graphite fill), now containing one or more NH or nanochannel lattices.

NHs or nanochannels having sizes ranging as small as about 50 nm or less and arranged in lattices having a density of about $10^{-4}$ nm$^{-2}$ or greater can be produced using such techniques.

A number of embodiments of the invention have been described. Nevertheless, it will be understood that various modifications may be made without departing from the spirit and scope of the invention.

What is claimed is:

1. A magnetic material comprising:
a two-dimensional array of carbon atoms; and
a two-dimensional array of nanoholes patterned in said two-dimensional array of carbon atoms,
wherein said magnetic material has long-range magnetic ordering at a temperature below a critical temperature Tc.

2. The magnetic material of claim 1, wherein Tc is greater than 298° K.

3. The magnetic material of claim 2, wherein Tc depends on a structural property of the two-dimensional array of nanoholes.

4. The magnetic material of claim 3, wherein the two-dimensional array of carbon atoms consist of an open hexagonal array.

5. The magnetic material of claim 4, wherein the two-dimensional array of nanoholes comprises an array of nanoholes with edges having a zigzag configuration.

6. The magnetic material of claim 2, wherein the long-range magnetic ordering is ferromagnetic ordering.

7. The magnetic material of claim 2, wherein the long-range magnetic ordering is anti-ferromagnetic ordering.

8. The magnetic material of claim 5, wherein the two-dimensional array of nanoholes comprises a first sublattice of nanoholes and a second sublattice of nanoholes.

9. The magnetic material of claim 8, wherein the nanoholes of the first sublattice are arranged in a parallel configuration with respect to the nanoholes of the second sublattice.

10. The magnetic material of claim 8, wherein the nanoholes of the first sublattice are arranged in an anti-parallel configuration with respect to the nanoholes of the second sublattice.

11. The magnetic material of claim 2, wherein the array of nanoholes comprises at least one from the group of: a triangular shaped nanohole, a rhombus shaped nanohole, and a hexagonal nanohole.

12. The magnetic material of claim 2, wherein the array of nanoholes comprises a nanohole having a characteristic size of about 50 nm or less.

13. The magnetic material of claim 2, wherein the array of nanoholes comprises a nanohole having a characteristic size of about 100 nm or less.

14. The magnetic material of claim 2, wherein the array of nanoholes comprises a nanohole having a characteristic size of about 500 nm or less.

15. The magnetic material of claim 2, wherein the array of nanoholes comprises a nanohole having a characteristic size of about 1000 nm or less.

16. The magnetic material of claim 2, wherein the array of nanoholes comprises a nanohole having a characteristic size of about 5000 nm or less.

17. The magnetic material of claim 2, wherein the array of nanoholes has a density greater than about $10^{\wedge}-4$ nanoholes per nm$^2$.

18. The magnetic material of claim 2, wherein the array of nanoholes has a density within the range of about $10^{\wedge}-8$ nanoholes per nm$^2$ to about $10^{\wedge}-2$ nanoholes per nm$^2$.

19. A semiconductor material comprising:
a two-dimensional array of carbon atoms; and
a two-dimensional array of nanoholes patterned in said two-dimensional array of carbon atoms,
wherein said semiconductor material has a semiconductor bandgap $\Delta$.

20. The semiconductor material of claim 19, wherein bandgap $\Delta$ depends on a structural property of the two-dimensional array of nanoholes.

21. The semiconductor material of claim 19, wherein the two-dimensional array of carbon atoms consists of an open hexagonal array.

22. The semiconductor material of claim 21, wherein the two-dimensional array of nanoholes comprises an array of nanoholes with edges having an armchair configuration.

23. The semiconductor material of claim 22, wherein the array of nanoholes consists of an array of triangular or rhombus shaped nanoholes.

24. The semiconductor material of claim 19, wherein $1\,\mathrm{meV} \leq \Delta \leq 20\,\mathrm{meV}$.

25. The semiconductor material of claim 19, wherein $1\,\mathrm{meV} \leq \Delta \leq 2\,\mathrm{eV}$.

26. A diluted magnetic semiconductor comprising:
a two-dimensional array of carbon atoms;
a two-dimensional array of a first type of nanoholes patterned in said two-dimensional array of carbon atoms; and
a two-dimensional array of a second type of nanoholes patterned in said two-dimensional array of carbon atoms,
wherein said diluted magnetic semiconductor material has a semiconductor bandgap $\Delta$, and
wherein said diluted magnetic semiconductor has long-range magnetic ordering at a temperature below a critical temperature Tc.

27. The diluted magnetic semiconductor of claim 26, wherein Tc is greater than 298° K.

28. The diluted magnetic semiconductor of claim 27, wherein the two-dimensional array of the first type of nanoholes consists of nanoholes having intra-nanohole magnetic ordering.

29. The diluted magnetic semiconductor of claim 28, wherein Tc depends on a structural property of the two-dimensional array of the first type of nanoholes.

30. The diluted magnetic semiconductor of claim 29, wherein the bandgap $\Delta$ depends on a structural property of the two-dimensional array of the second type of nanoholes.

31. The diluted magnetic semiconductor of claim 30, wherein the two-dimensional array of carbon atoms consists of an open hexagonal array.

32. The diluted magnetic semiconductor of claim 31, wherein the two-dimensional array of the first type nanoholes comprises an array of nanoholes each with edges having a zigzag configuration.

33. The diluted magnetic semiconductor of claim 32, wherein the two-dimensional array of the second type nanoholes comprises an array of nanoholes each with edges having an armchair configuration.

34. The diluted magnetic semiconductor of claim 27, wherein the long-range magnetic ordering is ferromagnetic ordering.

35. The diluted magnetic semiconductor of claim 27, wherein the long-range magnetic ordering is anti ferromagnetic ordering.

36. The diluted magnetic semiconductor of claim 33, wherein the array of the second type of nanoholes consists of an array of rhombus shaped or hexagonal shaped nanoholes.

37. The diluted magnetic semiconductor of claim 27, wherein $1\,\mathrm{meV} \leq \Delta \leq 20\,\mathrm{meV}$.

38. The diluted magnetic semiconductor of claim 27, wherein $500\,\mathrm{meV} \leq \Delta \leq 2000\,\mathrm{meV}$.

39. A magnetic information storage media comprising:
a two-dimensional array of carbon atoms, said array comprising a plurality of magnetic nanostructures, each of said nanostructures being in one of least two available magnetic states, said at least two available magnetic states comprising:
a first magnetic state associated with a first memory state; and
a second magnetic state associated with a second memory state.

40. The magnetic information storage media of claim 39, wherein the plurality of magnetic nanostructures comprises a plurality of nanoholes.

41. The magnetic information storage media of claim 40, wherein, for each of the plurality of nanoholes, the first magnetic state is a state of intra-nanohole antiferromagnetic ordering and the second magnetic state is a state of intra-nanohole ferromagnetic ordering.

42. The magnetic information storage media of claim 41, further comprising a reader unit adapted to read out the magnetic state of one or more of the plurality of magnetic nanostructures.

43. The magnetic storage information media of claim 39, further comprising a write unit adapted to change the magnetic state of one or more of the plurality of magnetic nanostructures.

44. The magnetic information storage media of claim 40, wherein the plurality of nanoholes comprises a nanohole having a characteristic size of about 50 nm or less.

45. The magnetic information storage media of claim 40, wherein the plurality of nanoholes comprises a nanohole having a characteristic size in the range of about 50 nm to about 1000 nm.

46. The magnetic information storage media of claim 40, wherein the plurality of nanoholes has an average density greater than about $10^{-4}$ nanoholes per $\mathrm{nm}^2$.

47. The magnetic information storage media of claim 39, wherein the first and second magnetic states are stable over a timescale greater than 1 hour.

48. An apparatus comprising
a detector comprising:
a semiconductor material comprising:
a two-dimensional array of carbon atoms; and
a two-dimensional array of nanoholes patterned in said two-dimensional array of carbon atoms,
wherein said semiconductor material has a semiconductor bandgap $\Delta$, and
wherein the detector is adapted to produce a signal in response to electromagnetic radiation incident on the semiconductor material.

49. The apparatus of claim 48, wherein the bandgap $\Delta$ depends on a structural property of the two-dimensional array of nanoholes.

50. The apparatus of claim 48, wherein the detector is adapted to produce a signal in response to electromagnetic radiation incident on the semiconductor material, said radiation having a frequency corresponding to a photon energy at or near the bandgap $\Delta$.

51. The apparatus of claim 50, wherein $1\,\mathrm{meV} \leq \Delta \leq 20\,\mathrm{meV}$, and the detector is adapted to produce a signal in response to electromagnetic radiation incident on the semiconductor material, said radiation having a frequency in the terahertz or far infrared radiation.

52. A magnetic material comprising:
a plurality of layers, each comprising a two-dimensional array of carbon atoms; and
a two-dimensional array of nanoholes patterned in at least one of the said two-dimensional array of carbon atoms,
wherein said magnetic material has long-range magnetic ordering at a temperature below a critical temperature Tc.

53. The magnetic material of claim 52, wherein Tc is greater than 298° K.

54. The magnetic material of claim 53, wherein Tc depends on a structural property of the two-dimensional array of nanoholes.

55. The magnetic material of claim 54, wherein the plurality of layers comprises a top layer and one or more underlying layers, and the two-dimensional array of nanoholes is patterned in the top layer.

56. The magnetic material of claim 55, wherein the two-dimensional array of nanoholes comprises an array of nanoholes with edges having a zigzag configuration.

57. The magnetic material of claim 56, wherein the one or more underlying layers comprise bulk carbon.

58. A magnetic material comprising:
a plurality of layers stacked along a vertical direction, each layer comprising a two-dimensional array of carbon atoms; and
a two-dimensional array of nanotunnels patterned substantially vertically through the plurality of layers,
wherein said magnetic material has long-range magnetic ordering at a temperature below a critical temperature Tc.

59. The magnetic material of claim 58, wherein Tc is greater than 298° K.

60. The magnetic material of claim 59, wherein Tc depends on a structural property of the two-dimensional array of nanotunnels.

61. The magnetic material of claim 60, wherein the two-dimensional array of nanoholes comprises an array of nanotunnels with edges having a zigzag configuration.

62. The magnetic material of claim 56, wherein the plurality of layers comprises bulk carbon.

63. An apparatus comprising
a detector material comprising:
a two-dimensional array of carbon atoms; and
a two-dimensional array of nanoholes patterned in said two-dimensional array of carbon atoms; and
a monitor which produces a signal indicative of a change in a physical property of the material in response to a change in a chemical environment of the detector material.

64. The apparatus of claim 63, wherein the monitor produces a signal indicative of a change in a transport property of the detector material in response to adsorption of molecules from the chemical environment by the two-dimensional array of nanoholes.

* * * * *

UNITED STATES PATENT AND TRADEMARK OFFICE
CERTIFICATE OF CORRECTION

PATENT NO. : 8,440,331 B2  
APPLICATION NO. : 12/921981  
DATED : May 14, 2013  
INVENTOR(S) : Feng Liu Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 385 days.

Signed and Sealed this
Eighth Day of September, 2015

Michelle K. Lee
*Director of the United States Patent and Trademark Office*